United States Patent
Michaud-Lariviere

(10) Patent No.: US 12,168,970 B1
(45) Date of Patent: Dec. 17, 2024

(54) WIND TURBINE AND AEROGENERATOR

(71) Applicant: Wattmakers LLC, Oakland, CA (US)

(72) Inventor: Jérôme François Marie Michaud-Lariviere, Paris (FR)

(73) Assignee: Wattmakers LLC, Oakland, CA (US)

( * ) Notice: Subject to any disclaimer, the term of this patent is extended or adjusted under 35 U.S.C. 154(b) by 0 days.

(21) Appl. No.: 18/585,792

(22) Filed: Feb. 23, 2024

(51) Int. Cl.
  *F03D 3/06* (2006.01)
  *F03D 9/25* (2016.01)
  *F03D 80/00* (2016.01)
  *H02K 7/18* (2006.01)

(52) U.S. Cl.
  CPC ............... *F03D 3/062* (2013.01); *F03D 9/25* (2016.05); *F03D 80/00* (2016.05); *H02K 7/183* (2013.01); *F05B 2220/706* (2013.01)

(58) Field of Classification Search
  CPC ............ F05B 2240/213; F05B 2250/71; F05B 2250/712
  See application file for complete search history.

(56) References Cited

U.S. PATENT DOCUMENTS

| | | | |
|---|---|---|---|
| 10,253,754 B2 * | 4/2019 | Aga | F03D 3/005 |
| 10,865,770 B2 * | 12/2020 | De Campos Ruao Da Cunha | F03D 3/0409 |
| 2015/0108762 A1 | 4/2015 | Michaud-Lariviere | |

FOREIGN PATENT DOCUMENTS

| | | |
|---|---|---|
| FR | 3058285 A1 | 5/2018 |
| WO | 2016042265 A1 | 3/2016 |

* cited by examiner

*Primary Examiner* — Courtney D Heinle
*Assistant Examiner* — Danielle M. Christensen
(74) *Attorney, Agent, or Firm* — WEITZMAN LAW OFFICES, LLC

(57) ABSTRACT

The wind turbine comprises a rotor which rotates with respect to a stator about a rotation axis. The rotor comprises at least one blade with a cavity, and a particulate filter fixed into the cavity.

12 Claims, 5 Drawing Sheets

[Fig. 1]
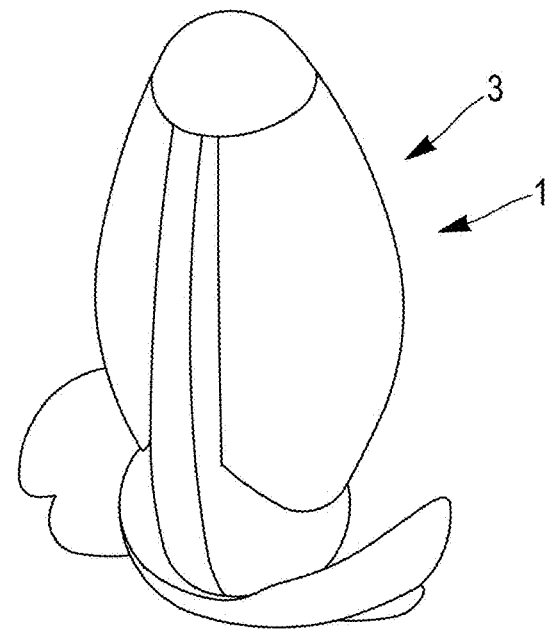
[Fig. 2]
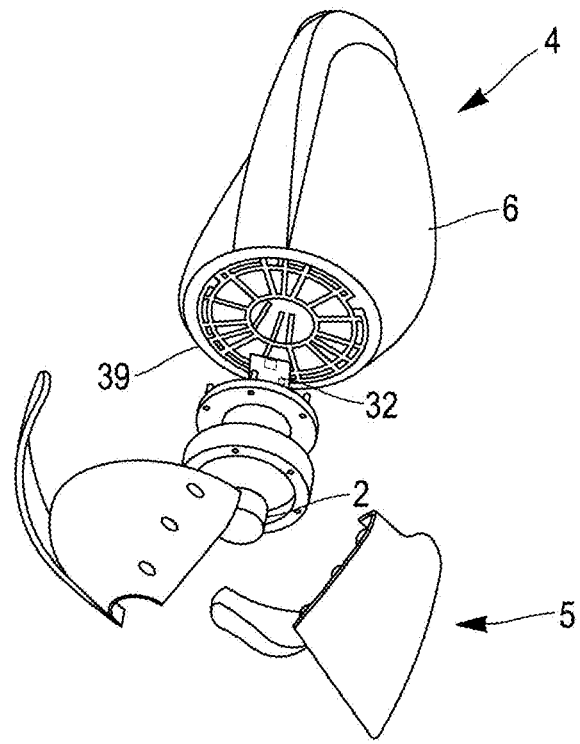

[Fig. 3]
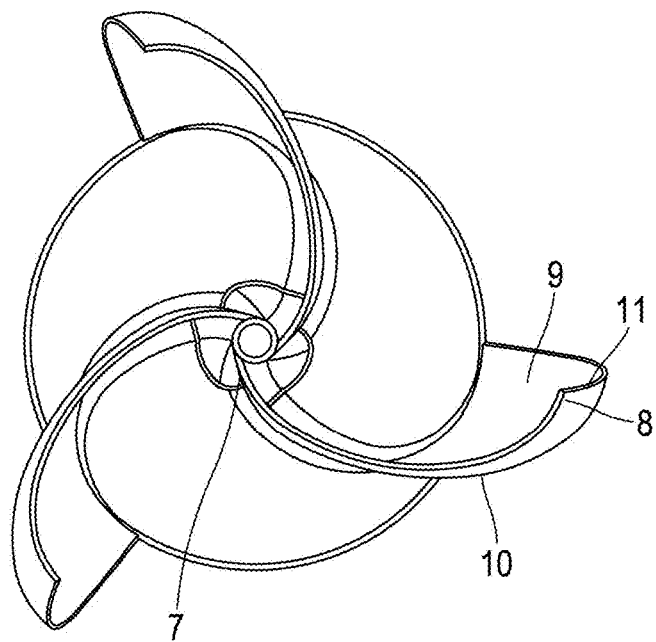
[Fig. 4]
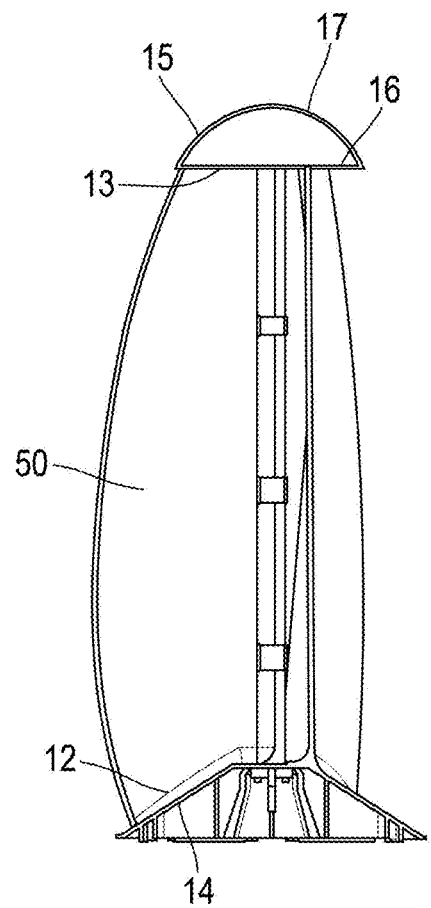

[Fig. 5]
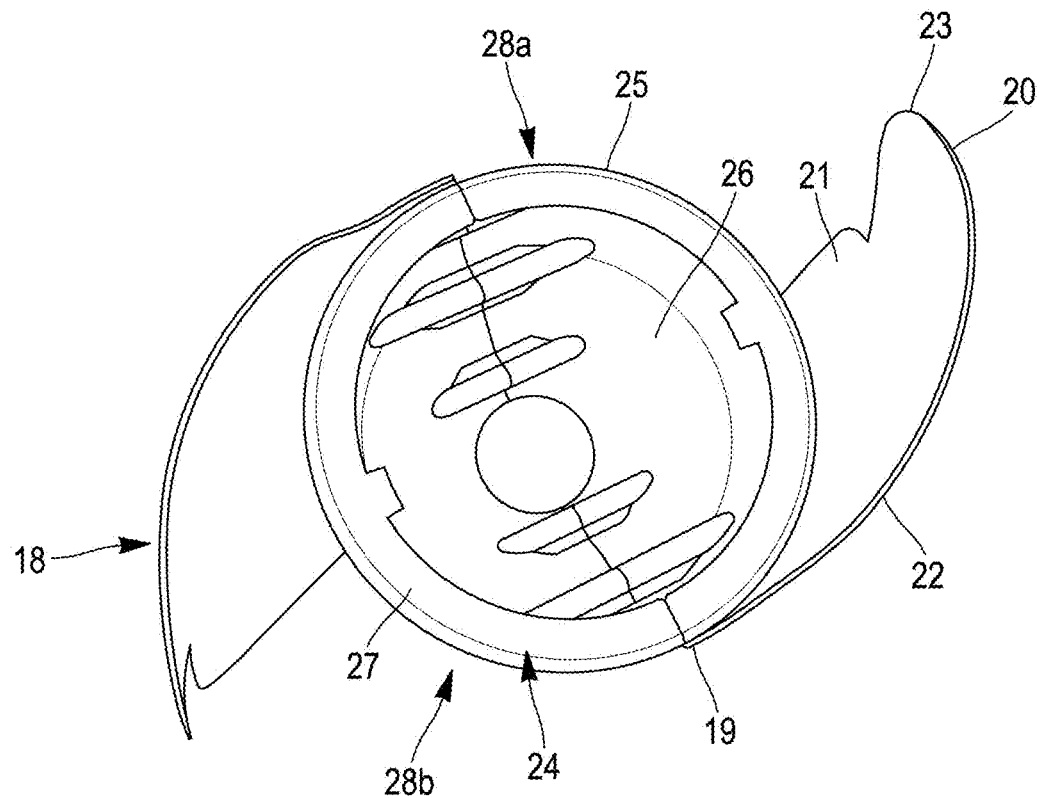
[Fig. 6]
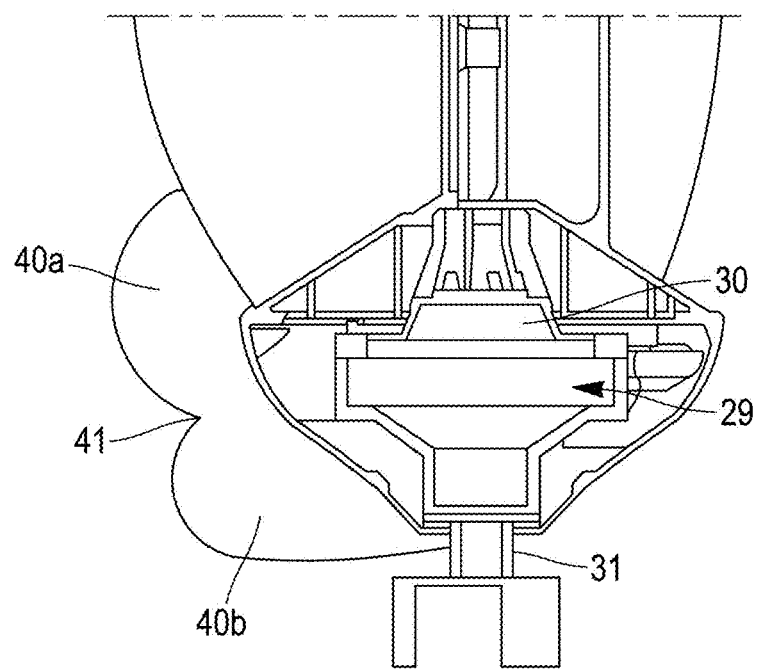

[Fig. 7]
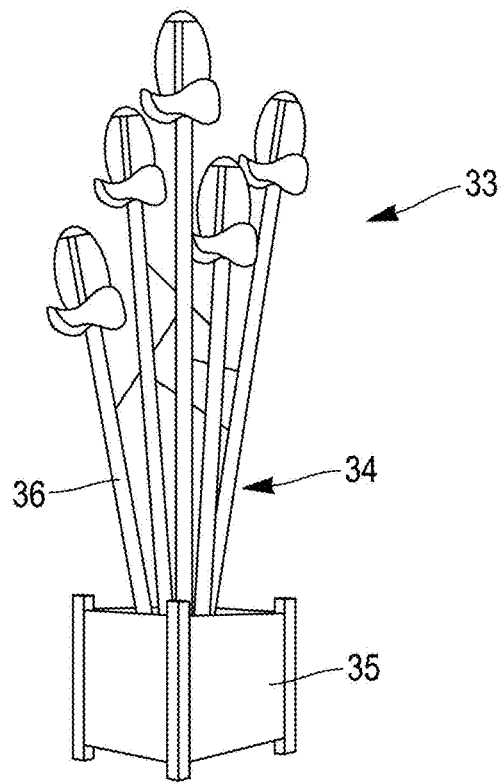
[Fig. 8]
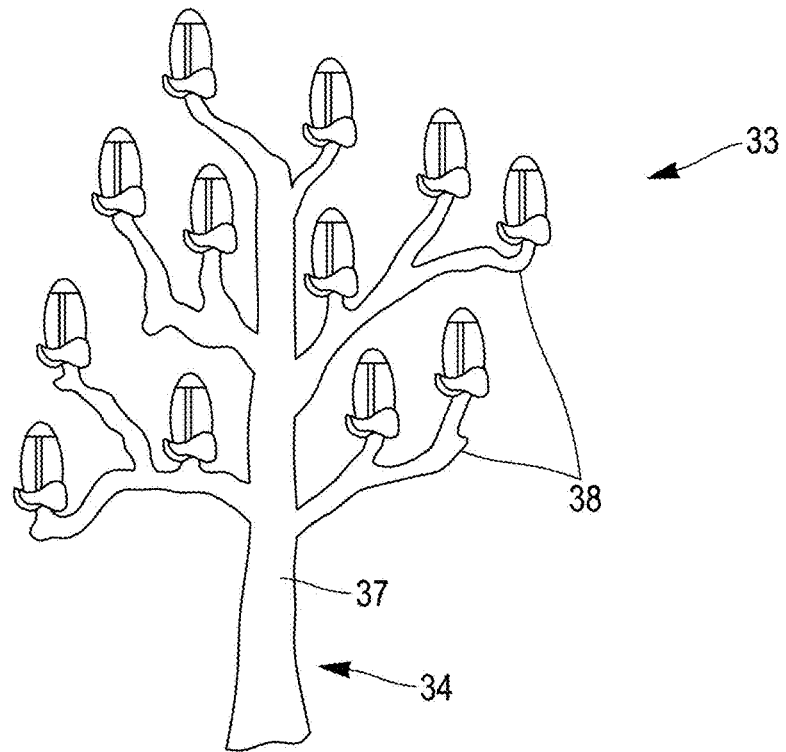

[Fig. 9]
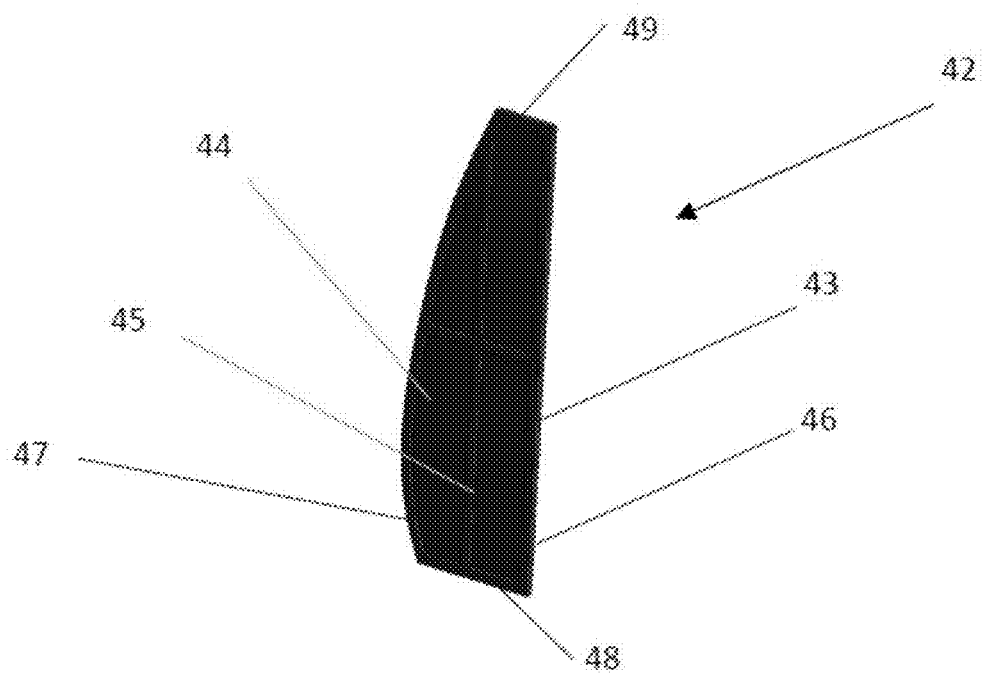
[Fig. 10]
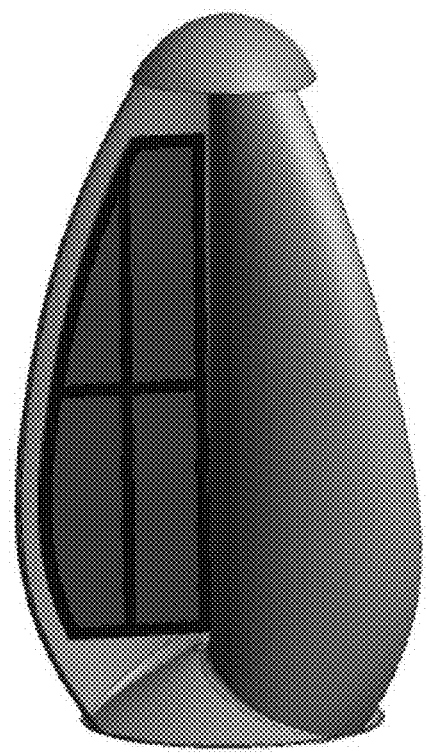

WIND TURBINE AND AEROGENERATOR

FIELD OF INVENTION

The present invention relates to the field of wind turbines.

BACKGROUND OF THE INVENTION

Wind turbines typically comprise an electrical generator which comprises a generator rotor rotating with respect to a generator stator about a rotation axis, this movement generating electricity. The rotor typically has one or more blades which are designed to catch the wind, so that the wind imparts the rotary motion to the rotor. In the field of wind turbines, one approach is to generate more and more power by ever-larger wind turbines. One issue however is that these very large wind turbines trouble human life and, therefore, they are to be placed far away from humans and human activities. This technology therefore relies on electrical cables to bring the generated electricity from where it is produced to where it is needed, but much energy is lost during transportation.

Recently, it was proposed in US 2015/108762 to use smaller such wind turbines, which can therefore be integrated where energy is needed. In order to make such wind turbines acceptable, a biomorphic approach was used, and many small wind turbines are provided on a tree-like structure.

The challenges associated with this technology are to generate enough power while not degrading the biomorphism, in order to ensure the acceptability.

SUMMARY OF THE INVENTION

According to the invention, it is provided a wind turbine, wherein the wind turbine comprises a rotor, wherein the rotor is designed to rotate with respect to a stator about a rotation axis, wherein the rotor comprises at least one blade with a cavity, and a particulate filter fixed into the cavity.

Thanks to these features, pollution particles carried by the wind can be caught by the wind turbine, resulting in air depollution.

According to a specific embodiment, the particulate filter is an activated carbon filter.

According to a specific embodiment, the particulate filter is adapted to catch particles of more than 0.1 micrometers (μm), preferably more than 0.2 μm, notably more than 0.3 μm.

According to a specific embodiment, the particulate filter is adapted to catch particles of less than 0.5 micrometers (μm), preferably less than 0.4 μm, notably less than 0.3 μm.

According to a specific embodiment, the particulate filter has a thickness between 1 and 10 millimeters (mm), notably between 1.5 and 8 mm, more preferably before 2 and 6 mm.

According to a specific embodiment, the particulate filter is removably fixed into the cavity.

According to a specific embodiment, the rotor comprises at least one narrow blade with a blade edge, the at least one narrow blade has a first maximal lateral extension measured from the rotation axis to the blade edge of said narrow blade, and the rotor comprises at least one wide blade with a blade edge, the at least one wide blade has a second maximal lateral extension measured from the rotation axis to the blade edge of said wide blade, the blades are fixed with respect to one another, the second maximal lateral extension is at least 1.5 times the first maximal lateral extension, and said particulate filter is fixed to either said narrow blade or said wide blade.

The narrow blade has a first maximal height along the rotation axis, and the wide blade has a second maximal height along the rotation axis, and the first maximal height is greater than the second maximal height.

According to a specific embodiment, the wind turbine comprises a narrow blade portion and a wide blade portion which are separated from one another along the rotation axis, and all narrow blades are provided in the narrow blade portion and all wide blades are provided in the wide blade portion.

According to a specific embodiment, the narrow blade portion is a single piece. This enables to limit or reduce the number of mechanical fastenings used in the narrow blade portion, which in turn is benefic to withstand dynamic stresses and fatigue which typically occur at fastenings in mechanical devices. Since less energy is dissipated at fastenings, more of the imparted energy may contribute to the production of electricity.

According to a specific embodiment, the narrow blade portion is made of an additive manufacturing material.

According to a specific embodiment, the at least one narrow blade has a thickness which continuously increases from the blade edge.

According to a specific embodiment, the wide blade portion is mechanically assembled to the narrow blade portion.

According to a specific embodiment, the wide blade portion comprises a plurality of blade components which are assembled to one another.

According to a specific embodiment, the blade components are identical to one another. This enables to reduce the tooling necessary for production, which has a positive energetic impact.

According to a specific embodiment, the wind turbine further comprises an electrical generator comprising a generator rotor and a generator stator, wherein the generator rotor is designed to rotate with respect to the generator stator about said rotation axis, wherein the generator rotor is assembled to the rotor of the wind turbine, wherein the electrical generator is housed within the wide blade portion.

According to a specific embodiment, the wide blade comprises a plurality of lobes separated from one another by a recess.

According to a specific embodiment, the wind turbine further comprises an electrical generator comprising a generator rotor and a generator stator, wherein the generator rotor is designed to rotate with respect to the generator stator about said rotation axis, wherein the generator rotor is assembled to the rotor of the wind turbine.

According to a specific embodiment, the wind turbine comprises a first number of at least two narrow blades, wherein the narrow blades are equally spaced from one another about the rotation axis, wherein the wind turbine comprises a second number of at least two wide blades, wherein the wide blades are equally spaced from one another about the rotation axis.

According to a specific embodiment, the first number is strictly greater than the second number.

According to another aspect, the invention relates to an aerogenerator comprising a structure and a plurality of such individual wind turbines, wherein electrical current generated by the aerogenerator is a sum of electrical currents generated by said wind turbines.

BRIEF DESCRIPTION OF DRAWINGS

FIG. 1 is a three-dimensional top perspective view of a wind turbine according to one embodiment.

FIG. 2 is an exploded bottom perspective view of the wind turbine of FIG. 1.

FIG. 3 is a top sectional view of the narrow blade portion of the wind turbine of FIG. 1.

FIG. 4 is a front sectional view of the narrow blade portion of the wind turbine of FIG. 1.

FIG. 5 is a top view of the wide blade portion of the wind turbine of FIG. 1.

FIG. 6 is a partial front sectional view of the wind turbine of FIG. 1.

FIG. 7 is a perspective view of a first embodiment of an aerogenerator.

FIG. 8 is a perspective view of a second embodiment of an aerogenerator.

FIG. 9 is a perspective view of an embodiment of a particulate filter for the wind turbine of FIG. 1.

FIG. 10 is a front perspective view of a narrow blade portion with one particulate filter assembled to the rotor.

DETAILED DESCRIPTION OF THE INVENTION

In the present invention where gravity plays a role, "vertical" is used to designate the direction passing through the center of the Earth. "Horizontal" is used to designate the plane normal to the "vertical" direction. Words like "up", "down", "high", "low", "above", "below", etc. are used with respect to the vertical direction.

The present description is provided assuming the ground is horizontal. The invention would however be applicable everywhere, even if the ground is not strictly speaking horizontal. Wind is a flow of air which is typically parallel to the horizontal. The invention remains applicable when wind flows not strictly speaking horizontally, for example due to the shape of the ground, due to obstacles to flow such as trees, buildings or else, or for other reasons.

FIG. 1 schematically represents an embodiment of a wind turbine 1 according to one embodiment of the invention. A wind turbine 1 comprises a stator 2 and a rotor 3. The rotor 3 is mounted to rotate with respect to the stator 2 about a fixed rotation axis ($Z_r$). The present invention is applicable to so-called "vertical axis" wind turbines. A "vertical axis" wind turbine is a wind turbine designed to be used with its rotation axis $Z_r$ extending along the vertical direction. In the following description, it will be assumed that the wind turbine 1 is placed so that its rotation axis Zr extends vertically. Of course, the same turbine may be oriented differently.

The rotation axis is central for the rotor 3.

As can be seen on FIG. 1, according to one embodiment, the rotor 3 comprises a narrow blade portion 4 and a wide blade portion 5. The narrow blade portion 4 and the wide blade portion 5 are spaced from one another along the vertical axis. In the presented embodiment, the narrow blade portion 4 is located above the wide blade portion 5.

The narrow blade portion 4 is narrower than the wide blade portion 5. The breadth of the blade portions is measured as the maximal horizontal distance between the rotation axis and any point of the respective blade portion.

As can also be seen on FIG. 1, the narrow blade portion 4 is higher than the wide blade portion 5. The height of the blade portions is measured as the maximal vertical distance between any two points of the respective blade portion.

The narrow blade portion has a plurality of blades 6. The blades of the narrow blade portion are called "narrow blades" 6. These narrow blades 6 are equally distributed about the rotation axis. Further, the narrow blades 6 are identical to one another. This ensures a homogeneous transformation of wind energy to electrical energy. In the present example, there are three identical narrow blades 6 which form angles of 120° two by two about the rotation axis. Therefore, below, the description of a single narrow blade 6 will be provided, and this description will be applicable to the other narrow blades.

Below, we will describe one horizontal section of a narrow blade 6, with reference to FIG. 3. The rotor is designed to rotate in the clockwise direction on FIG. 3. The section comprises a proximal portion 7 and a distal portion 8. The words "proximal" and "distal" are used by reference to the central rotation axis.

The narrow blade 6 is a thin shell shaped to receive incoming wind. The shape comprises a curvature in the horizontal plane, as can be seen in FIG. 3. As can be seen on the other figures, the shape may also comprise a curvature in a vertically secant plane. The narrow blade 6 comprises a concave front face 9 and an opposed convex back face 10. The front and back faces 9 and 10 are sensibly parallel to one another. The thickness of the narrow blade 6 is sensibly constant, from the proximal portion 7 to the distal portion 8. This thickness, also called "main thickness" is for example comprised between 1.5 millimeters (mm) and 5 mm, preferably between 2.5 and 3.5 mm. This thickness of a suitable material allows supporting the imparting energy of wind with a minimum inertia. The distal portion 8 may have a continuously decreasing thickness from the connection to the proximal portion 7 to the edge 11. The thickness at the edge, also called "edge thickness", is for example not lower than 0.5 mm, notably not lower than 1.5 mm. This thickness allows sufficient strength of the edge. The ratio of the main thickness to the edge thickness is for example between 1.5 and 10, for example between 2.5 and 3.5. This allows manufacturability, strength, low inertia and low drag coefficient Cx of the blade.

As can be seen also from FIG. 3, the rotation axis Zr is disposed sensibly between the proximal portion 7 and the distal portion 8.

Along the vertical axis, the narrow blade 6 extends from a bottom portion 12 to a top portion 13. The bottom portion 12 is connected to a base 14 along its whole width. The top portion 13 is connected to a top 15 along its whole width. These two connections ensure a firm holding of the narrow blade 9 within the rotor 3.

Along the vertical axis, the edge 11 is also continuously curved. The location with the maximal lateral extension is between the bottom portion 12 and the top portion 13. More precisely, this location is closer to the bottom portion 12 than to the top portion 13, measured along the vertical axis. This enables the narrow blade portion 4 of the rotor 3 to look like a tree leaf. For example, the distance between the bottom portion 12 and the location with the maximal lateral extension of the narrow blade 6, along the vertical axis, is between ⅕ and ⅓ of the height of the narrow blade 6, along the vertical axis. The tapering shape of the narrow blade portion 4 allows to reduce the moments of force applied to the assembly of the wind turbine to its support.

The top 15 may comprise a continuous structure 16 which is connected to the top portions 13 of all narrow blades 6, for example a flat plate. The top 15 may further comprise an outer dome 17 which is connected to the continuous structure 16 and overlies it. The dome 17 strengthens the rotor 3 and provides a rounded top shape which is harmless in case of contacts and enables the rotor to look like a tree leaf.

The base 14 may be conically shaped pointing upward, with the rotation axis Zr as cone axis. This shape enables to provide space to house other components, such as will be described below. Further, this geometry strengthens the connection of the narrow blade portion 4 with the underlying elements which will be described below.

According to one embodiment, the narrow blade portion 4 which has been described above is single-piece. This enables to get rid of mechanical connection devices which allow play between components, and are subject to vibration. For example, the narrow blade portion 4 is manufactured by additive manufacturing. This additive manufacturing technology allows to manufacture a single piece with such a complex shape as that of the narrow blade portion 4. In such case, the narrow blade portion 4 is made of a suitable additive-manufacturing material, such as polylactic acid ("PLA") or acrylonitrile butadiene styrene ("ABS") or the like. One may choose a biodegradable, non-toxic, rigid, strong and/or sustainable material. So, when, in the description above, it is mentioned that two parts, sections or portions, are "connected", it should be understood that they are formed of an integral single-piece of material under this embodiment. Additive-manufacturing enables to obtain a thin blade with good mechanical strength, which lowers weight, inertia and cost of manufacturing with respect to thicker blades.

In addition, by reducing the mechanical fastenings, less energy is dissipated as mechanical energy at such fastenings, and the risk of loosening of attachments is reduced. Loosened attachments may cause dynamic stresses and fatigue to the wind turbine. Providing the narrow blade portion 4 as a single piece thus enables to increase the life expectancy of the wind turbine 1, and to maintain a high ratio of energy conversion along time.

As can be seen on FIG. 5, below, the rotor 3 further comprises the wide blade portion 5.

The wide blade portion 5 is wider than the narrow blade portion 4. For example, the maximal lateral extension of the wide blade portion 5 is at least 1.5 times the maximal lateral extension of the narrow blade portion 4. Notably, the ratio of the maximal lateral extension of the wide blade portion 5 to the maximal lateral extension of the narrow blade portion 4 is at least equal to 1.6, at least equal to 1.7, at least equal to 1.8, at least equal to 1.9, or at least equal to 2.

According to some embodiments, the ratio of the maximal lateral extension of the wide blade portion 5 to the maximal lateral extension of the narrow blade portion 4 is less than 2.5, notably less than 2.4, less than 2.3, less than 2.2, or even less than 2.

According to some embodiments, the diameter of the circle circumventing the wide blade portion 5, and hence the wind turbine 1, is comprised between 0.5 meters (m) and 1 m, preferably between 0.65 m and 0.7 m.

As can also be seen on FIG. 1, the wide blade portion 5 is shorter than the narrow blade portion 4, as measured along the vertical axis. For example, the maximal height of the narrow blade portion 4 is at least 1.5 times the maximal height of the wide blade portion 5. Notably, the ratio of the maximal height of the narrow blade portion 4 to the maximal height of the wide blade portion 5 is at least equal to 1.6, at least equal to 1.7, at least equal to 1.8, at least equal to 1.9, or at least equal to 2.

According to some embodiments, the ratio of the maximal height of the narrow blade portion 4 to the maximal height of the wide blade portion 5 is less than 3.5, notably less than 3 or even less than 2.5.

According to some embodiments, the height of the wind turbine 1 along the vertical axis, is comprised between 0.7 m and 1.5 m, preferably between 1.0 m and 1.2 m.

The wide blade portion 5 has a plurality of blades 18. The blades of the wide blade portion 5 are called "wide blades" 18. These wide blades 18 are equally distributed about the rotation axis. Further, the wide blades 18 are identical to one another. This ensures a homogeneous transformation of wind energy to electrical energy.

According to one embodiment, the number of wide blades 18 is identical to the number of narrow blades 6. In such an embodiment, narrow blades 6 and wide blades 18 may be aligned with one another two by two. According to a variant, the wide blades 18 are rotationally offset with respect to the narrow blades 6 about the rotation axis. The offset is for example half of the angle between two following narrow blades 6.

According to another embodiment, the number of wide blades 18 is different from the number of narrow blades 6. For example, the difference between the number of wide blades 18 and the number of narrow blades 6 is equal to 1. According to another example, it is equal to 2. For example, it is less than 6, notably less than 4.

In the present example, there are two identical wide blades 18 which form an angle of 180° with one another about the rotation axis. In addition, no wide blade 18 is aligned with a corresponding narrow blade along the vertical axis. The angle between a narrow blade 6 and a wide blade 18 is at least 30°.

Below, the description of a single wide blade 18 will be provided, and this description will be applicable to the other wide blade(s) 18.

Below, we will describe one wide blade 18, with reference to FIG. 5. The wide blade 18 comprises a proximal portion 19 and a distal portion 20. The words "proximal" and "distal" are used by reference to the central rotation axis.

The wide blade 18 is a thin shell shaped to receive incoming wind. The shape comprises a curvature in the horizontal plane, as can be seen in FIG. 5. As can be seen on the other figures, the shape may also comprise a curvature in a vertically secant plane. So, overall, the wide blade 18 defines a cavity 50. The wide blade 18 comprises a concave front face 21 and an opposed convex back face 22. With respect to the rotation axis, the concavity of the wide blade 18 is the same as that of narrow blade 6. The front and back faces 21 and 22 are sensibly parallel to one another. The thickness of the wide blade 18 is sensibly constant, from the proximal portion 19 to the distal portion 20. For example, this thickness, also called "main thickness" is the same as that of the narrow blade 6. This thickness allows supporting the imparting energy of wind with a minimum inertia. The distal portion 20 may have a continuously decreasing thickness from the connection to the proximal portion 19 to the edge 23. In other words, the thickness continuously increases, starting from the edge. The thickness at the edge, also called "edge thickness", is for example not lower than 0.5 mm. For example, it is the same as for the narrow blade 6. This thickness allows sufficient strength of the edge. The ratio of the main thickness to the edge thickness is for example between 1.5 and 10. For example, it is the same as for the narrow blade 6. This allows manufacturability, strength, low inertia and low drag coefficient Cx of the blade.

According to one embodiment, as shown in particular on FIGS. 1 and 6, the wide blade 18 comprises at least two lobes 40. The two lobes 40 are spaced from one another along the rotation axis Zr. In other words, the wide blade 18 comprises a top lobe 40a and a bottom lobe 40b. Two consecutive lobes 40a, 40b along the rotation axis are therefore separated by a recess 41. This configuration allows to reduce the drag coefficient of the wide blade 18.

According to one embodiment, the wide blade portion 5 comprises a bottom housing 24 from which the wide blades 18 extend. The bottom housing 24 is for example cup-shaped, with a narrow bottom and a large upper opening 26. The cup is for example partly spherical, or partly cylindrical of revolution. The bottom housing 24 has a shell 27 from which the wide blades 18 extend radially outward. The wide blade 18, and notably the top lobe 40a extends above the top plane of the bottom housing 24.

For example, the wide blade portion is made of a plurality of blade components which are assembled to one another by any suitable means, notably screwing, bolting, crimping or snap-fastening. According to one example, all blade components are identical, which enables to reduce the number of molds necessary for the production of the wide blade. Each blade component may comprise one single wide blade 18 and a portion of the bottom housing 24. For example, as shown on FIG. 5, the wide blade portion is made of two identical blade components 28a and 28b which are assembled to one another. Reference "28" is used to generally designate one of these blade components.

According to one embodiment, each of the blade components 28 which has been described above is single-piece. This enables to get rid of mechanical connection devices which allow play between components, and are subject to vibration. For example, the blade component 28 is manufactured by additive manufacturing. This additive manufacturing technology allows to manufacture a single piece with such a complex shape as that of the blade component 28. In such case, the blade components 28 is made of a suitable additive-manufacturing material, such as polylactic acid ("PLA") or acrylonitrile butadiene styrene ("ABS") or the like. One may choose a biodegradable, non-toxic, rigid, strong and/or sustainable material. Possibly, one will use the same material as that of the narrow blade portion 4, in order to obtain similar mechanical properties. So, when, in the description above, it is mentioned that two parts, sections or portions, are "connected", it should be understood that they are formed of an integral single-piece of material under this embodiment. According to an embodiment, the material constituting the blade component 28 is the same as that constituting the narrow blade portion 4.

The narrow blade portion 4 and the wide blade portion 5 are fixedly assembled to one another by any suitable means, such as screwing, bolting, crimping, snap-fastening, or the like. Preferably, the assembly may be undone using suitable tools, for example for maintenance.

The wind turbine 1 further comprises an electrical generator 29, such as shown on FIG. 6. The electrical generator 29 comprises a generator rotor 30 and a generator stator 31. The generator rotor 30 is designed to rotate with respect to the generator stator 31 about a rotation axis. When the electrical generator 29 is assembled within the wind turbine, this rotation axis is the rotation axis Zr. The generator rotor 30 is assembled to the rotor 3 of the wind turbine 1. In particular, as shown on FIG. 6, the electrical generator 29 is housed within the wide blade portion 5, notably in the bottom housing 24, and attached thereto and/or to the base 14 of the narrow blade portion 4 by any suitable means.

According to one embodiment, the generator rotor 30 may comprise a plurality of permanent magnets with alternated polarity, and the generator stator 31 has electrical coils intended to interact with the permanent magnets of the generator rotor 30, so that rotation of the rotor 3 generates an alternating electrical field at the generator stator 31.

The wind turbine 1 further comprises an electronical circuit 32. The electronical circuit 32 comprises a microprocessor 39 adapted to regulate the electrical current outputted from the wind turbine 1. For example, the electrical current generated by the wind turbine 1 is a 3-phase 48V alternating current.

According to some embodiments, a redresser (not shown) of the electronical circuit 32 may redress the alternating current to a DC current.

As can be seen on FIG. 9, the wind turbine 1 comprises a filter 42. The filter 42 is adapted to catch particles contained in the air which flows through the filter 42. The filter 42 is designed to catch specific particles. For example, the filter 42 is adapted to catch particles as a function of their size. Particulate size may be defined in any suitable way, such as average diameter of the particle or the like. For example, the particulate filter 42 is adapted to catch particles of more than 0.1 micrometers (μm), preferably more than 0.2 μm, notably more than 0.3 μm.

For example, the particulate filter 42 is adapted to catch particles of less than 0.5 micrometers (μm), preferably less than 0.4 μm, notably less than 0.3 μm.

The filter 42 is adapted to catch pollutant particles such as carbon oxides (carbon monoxide, carbon dioxide, . . . ), metals (lead, . . . ), nitrogen oxides, sulfur oxides (sulfur dioxides), ozone, plastics, dust, biological matter, acrolein, asbestos, benzene, carbon sulfides (carbon disulfides), creosotes, fuel oils, polycyclic aromatic hydrocarbons, synthetic vitreous fibers, total petroleum hydrocarbons, or other pollutant particles, when applicable.

The filter 42 comprises a frame 43 and an active portion 44. The frame 43 is a peripheral frame made of a rigid material such as plastic. The frame 43 may made of a suitable additive-manufacturing material, such as polylactic acid ("PLA") or acrylonitrile butadiene styrene ("ABS") or the like. For example, the material of the frame 43 is the same as the one of the narrow blade 6, which is beneficial for example to limit stresses due to differential thermal deformation. The frame 43 is designed to enable the assembly of the filter 42 to the narrow blade 6, as will be described later. The frame 43 is also designed for maintaining the active portion 44. Such as shown, the frame 43 may further comprise an internal structure 45 such as an armature, to improve rigidity. The frame 43 has a thin thickness, so that the frame 43, and hence the filter 42, may be considered as planar.

The frame 43 has a peripheral contour which has a shape complementary to the shape of the narrow blade portion 4. According to the present example, which is purely illustrative, the frame 43 comprises a radially inner upright 46 which is shaped to correspond to the outer surface of the proximal portion 7 of the neighboring narrow blade 6. For example, the radially inner upright 46 extends along the rotation axis Zr.

The frame 43 further comprises a radially outer upright 47 which is shaped to correspond to the inner face of the distal portion 8 of the narrow blade 6, and is therefore arcuate as can be seen on FIG. 9. Yet, the main direction of extension of the radially outer upright 47 also is the rotation axis Zr.

The frame 43 comprises a bottom crosspiece 48 and a top crosspiece 49. These crosspieces 48, 49 connect the uprights 46 and 47 to one another. The bottom crosspiece 48 may be shaped to fit the bottom portion 12 of the narrow blade 6 and/or extends horizontally. The top crosspiece 49 may be shaped to fit the top portion 13 of the narrow blade 6 and/or extends horizontally.

According to one embodiment, the filter 42 comprises an active portion 44 of activated carbon, also called "activated charcoal". The thickness of the active portion 44 is designed to be able to catch enough particulates, and last for a sufficient time. This may depend on the average local pollution. The thickness of the active portion 44 is for example between 1 and 10 millimeters (mm), notably between 1.5 and 8 mm, more preferably before 2 and 6 mm. The thickness is measured orthogonally to the plane defined by the frame 43. The frame 43, and hence the whole filter 42, may have the same thickness as the active portion 44.

As can be seen on FIG. 10, the filter 42 is assembled to the narrow blade portion 4 in any suitable way, such as by bolting, riveting or snap-fitting. For example, the filter 42 is removably assembled to the narrow blade portion 4. This could for example be achieved by screwing or snap-fitting. The narrow blade 5 may comprise pegs which enable the frame 43 to be inserted by snap-fitting, by local temporary deformation of the frame 43, the pegs then maintaining the frame in place. Pegs may be provided integral with the narrow blade during the 3D-manufacturing process. In this way, the filter 42 may be withdrawn and replaced by another filter. For example, the active portion 44 may be releasably mounted to the frame 43. The active portion 44 may be compressed in order to be inserted in the frame 43, and is maintained there being permanently compressed. The capacity of the filter 42 is designed so that the replacement of the filter 42 is performed at the same frequency as the overall maintenance of the wind turbine, typically about once a year.

Each of the narrow blades 6 of the narrow blade portions may receive such a filter 42 in their cavity. The filters 42 are thus all identical. The mass of the filters 42 is typically less than 2% of the total mass of the wind turbine, and therefore has a minimal impact on the energetical performance of the wind turbine.

In addition or in the alternative, the wide blades 18 may comprise filters 42 as described above. The shape of these filters 42 is adapted to fit the shape of the wide blades 18.

The invention is applicable to any blade of a wind turbine having a cavity suitable to receive a filter 42, as was described above with respect to one specific embodiment.

A comparison example is a wind turbine as described above, with the same blade surface as the invention, but with identical widths in the bottom and top blade portions. So, compared with the wind turbine of the invention, the width of the bottom blade portion of the comparison example is less than the width of the wide blade portion of the invention, and the width of the top blade portion of the comparison example is greater than the width of the narrow blade portion of the invention.

Assuming a starting condition of low wind, so that the wind turbine 1 is immobile, when wind speed rises, the wide blade portion enables a lower starting threshold for the wind turbine 1 of the invention as compared to the comparative example. This is due to the fact that the forces exerted at the edge of the wide blades 18 exhibit a larger moment with respect to the rotation axis. So, compared with the comparative example, the wind turbine 1 produces electrical energy at slow winds, where the comparative example does not. As wind picks up, it imparts rotation to the narrow blades 6, which have a lower moment of inertia, which increases the speed of rotation and hence the intensity of generated electrical current.

According to some embodiments, wind turbines such as described above have a starting threshold of less than 10 m/s, even less than 6 m/s, preferably less than 5 m/s.

So, overall, the time during which the wind turbine 1 according to the invention produces electricity is greater than that of the comparative example.

As can be seen on FIG. 7, according to one embodiment, an aerogenerator 33 comprises a plurality of wind turbines. For example, one, at least one, more than one or all of the wind turbines are wind turbines 1 according to the above description.

In particular, these wind turbines 1 comprise filters 42 as described above. Thus, the whole volume of air which imparts the aerogenerator 33 can be depolluted.

For example, the electrical generators 29 of one or more or all of the wind turbines of the aerogenerator 33 are each controlled independently from one another by their respective microcontroller 39. They are electrically connected to one another in parallel, so that the electrical current output by the aerogenerator 33 is the sum of the electrical currents generated by the individual wind turbines 1. This allows for example various wind turbines to rotate at different speeds (or even potentially some of them not rotating), due to the local flow of wind, screening effects, or any other reasons, and to adapt to ever-changing wind conditions.

The microcontroller 39 may implement an AI-based rule for the control of its individual wind turbine.

As shown on FIG. 7, the aerogenerator 33 comprises a structure 34 which carries the wind turbines 1. The structure 34 is designed to place the carried wind turbines 1 in space according to an arrangement which maximizes electrical energy output for incoming wind. For example, wind turbines are arranged so that screening between wind turbines is null or low. Screening relates to a part of a wind turbine being behind a part of another wind turbine along a direction of wind flow. However, even if air passes through a plurality of turbines, it is depolluted a plurality of times, which is beneficial. Further, the wind turbines are arranged so that, taking into account a cylinder circumscribing the wind turbines together, along a direction of wind flow, the cross-section of this cylinder which is not intercepted by a wind turbine is minimal.

For example, the wind turbines 1 are offset from one another in all three directions of space.

The structure 34 may for example comprise a foot 35 and a plurality of poles 36 extending sensibly vertically from the foot 35, and a wind turbine 1 assembled to each pole 36. The wind turbine 1 may be assembled to a pole 36 by any suitable means. In particular, the generator stator 31 is assembled to the pole 36. Electrical wires (not shown), which deliver electrical energy from the wind turbine 1 may extend inside the inner lumen of the pole 36 to the foot 35, which houses an electrical cabinet.

According to another embodiment, as shown on FIG. 9, the aerogenerator 33 may comprise a structure 34 with a more complex shape, comprising a common trunk 37 from which extend, at various levels, and in various directions, branches 38 which each carry one or more wind turbines 1. The volume of air depolluted by such an embodiment may be more than 100 cubic meters ($m^3$), for example more than 200 $m^3$, or even more, depending on the number and disposition of wind turbines.

REFERENCES

Wind turbine 1

Stator 2

Rotor 3
Narrow blade portion 4
Wide blade portion 5
Narrow blade 6
Proximal portion 7
Distal portion 8
Front face 9
Back face 10
Edge 11
Bottom portion 12
Top portion 13
Base 14
Top 15
Structure 16
Dome 17
Wide blade 18
Proximal portion 19
Distal portion 20
concave front face 21
convex back face 22
edge 23
bottom housing 24
bottom 25
upper opening 26
shell 27
blade components 28a, 28b
generator 29
generator rotor 30
generator stator 31
electronical circuit 32
aerogenerator 33
structure 34
foot 35
pole 36
trunk 37
branches 38
microprocessor 39
lobe 40, 40a, 40b
recess 41
filter 42
frame 43
active portion 44
internal structure 45
upright 46, 47
crosspieces 48, 49
cavity 50

The invention claimed is:

1. A wind turbine, comprising:
a rotor configured to rotate with respect to a stator about a rotation axis, wherein the rotor comprises:
  at least one blade with a cavity, and a particulate filter fixed into the cavity;
  at least one narrow blade with a blade edge, wherein the at least one narrow blade has a first maximal lateral extension measured from the rotation axis to the blade edge of said narrow blade; and
  at least one wide blade with a blade edge, wherein the at least one wide blade has a second maximal lateral extension measured from the rotation axis to the blade edge of said wide blade,
wherein the blades are fixed with respect to one another,
wherein the second maximal lateral extension is at least 1.5 times the first maximal lateral extension, and
wherein said particulate filter is fixed to either said narrow blade or said wide blade.

2. The wind turbine according to claim 1, wherein the narrow blade has a first maximal height along the rotation axis, and the wide blade has a second maximal height along the rotation axis, and wherein the first maximal height is greater than the second maximal height.

3. The wind turbine according to claim 1, wherein the wind turbine comprises a narrow blade portion and a wide blade portion which are separated from one another along the rotation axis, and wherein all narrow blades are provided in the narrow blade portion and all wide blades are provided in the wide blade portion.

4. The wind turbine according to claim 3, wherein the narrow blade portion is a single piece.

5. The wind turbine according to claim 3, wherein the narrow blade portion is made of an additive manufacturing material.

6. The wind turbine according to claim 3, wherein the at least one narrow blade has a thickness which continuously increases from the blade edge.

7. The wind turbine according to claim 3, wherein the wide blade portion is mechanically assembled to the narrow blade portion.

8. The wind turbine according to claim 3, wherein the wide blade portion comprises a plurality of blade components which are assembled to one another, and wherein the blade components are identical to one another.

9. The wind turbine according to claim 3, further comprising an electrical generator comprising a generator rotor and a generator stator, wherein the generator rotor is designed to rotate with respect to the generator stator about said rotation axis, wherein the generator rotor is assembled to the rotor of the wind turbine, wherein the electrical generator is housed within the wide blade portion.

10. The wind turbine according to claim 1, wherein the wide blade comprises a plurality of lobes separated from one another by a recess.

11. The wind turbine according to claim 1, wherein the wind turbine comprises a first number of at least two narrow blades, wherein the narrow blades are equally spaced from one another about the rotation axis, wherein the wind turbine comprises a second number of at least two wide blades, wherein the wide blades are equally spaced from one another about the rotation axis.

12. The wind turbine according to claim 11, wherein the first number is strictly greater than the second number.

* * * * *